(No Model.)

R. WINDER.
NOSE BAND FOR BRIDLES OR HALTERS.

No. 329,352. Patented Oct. 27, 1885.

Witnesses.
Dennis Sumby.
Robert Everett.

Inventor.
Richard Winder.
By James L. Norris.
Atty.

UNITED STATES PATENT OFFICE.

RICHARD WINDER, OF FARNINGHAM, COUNTY OF KENT, ENGLAND.

NOSE-BAND FOR BRIDLES OR HALTERS.

SPECIFICATION forming part of Letters Patent No. 329,352, dated October 27, 1885.

Application filed August 11, 1885. Serial No. 174,130. (No model.) Patented in England January 5, 1884, No. 797.

*To all whom it may concern:*

Be it known that I, RICHARD WINDER, a subject of the Queen of Great Britain, residing at Farningham, in the county of Kent, England, engineer, have invented certain new and useful Improvements in Means and Appliances for Curbing and Controlling Horses and other Animals and Beasts of Burden, (for which I have obtained a patent in Great Britain, No. 797, dated January 5, 1884,) of which the following is a specification.

The object of my invention is to provide an improved safety appliance for controlling and curbing runaway horses and other animals and beasts of burden, such appliance being used for those purposes and acting independently of the ordinary bit. I affix to the bridle a curved metal band, which passes over the nose of the animal. This band has two rather sharp inner edges, and when it is pulled by the rider or driver it presses upon the lower part of the bone at the nose, and thereby quiets the animal, and brings him under the control of the rider or driver.

Figure 1:
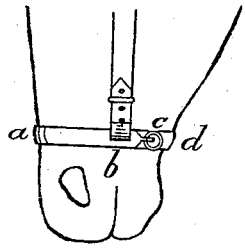

Figure 1 is a side view of a portion of a horse's head with the metal band in position upon it. *a* is the metal band, which in the front part, against the nose, is hollow in shape, so as to form two cutting-edges to stop the animal when pulled at by the rider or driver. *b* is a slot cut out of the metal on each side, in which the bridle or headstall is buckled or otherwise fixed. *c* is a ring, of which there are two, (one on each side,) in which the reins are fastened. *d* is a leather strap fastened at each end to the metal band, thus forming a check-strap to prevent the metal band rising on the animal's head when pulled at, especially if the animal when so pulled raises its head into a horizontal position.

Figure 2:
Figure 3:
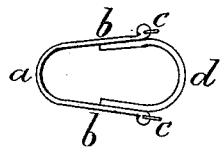

Fig. 2 is a side view of the metal band, shown sectional at *a*. Fig. 3 is a plan view of the metal band and strap *d*.

A bit in the mouth of the animal may be dispensed with when the above-described metal band is used.

What I claim as my invention is—

A device for curbing and controlling horses, consisting of the nose-band *a*, having sharpened inner edges, and provided with slots *b*, for attachment of the headstall or bridle, and rings *c*, for attachment of the driving-reins, and a strap, *d*, attached to both ends of the nose-band *a* and passed over the lower jaw of the animal in line with the nose-band, as and for the purpose described.

In testimony whereof I have hereto set my hand this 23d day of July, 1885.

RICHD. WINDER.

Witnesses:
 GEO. C. DOWNING,
  8 *Quality Court, London, W. C.*
 ARTHUR R. SKERTEN,
  17 *Gracechurch St., London, E. C*